US008601160B1

(12) United States Patent
Sargent

(10) Patent No.: US 8,601,160 B1
(45) Date of Patent: Dec. 3, 2013

(54) SYSTEM, METHOD AND COMPUTER PROGRAM PRODUCT FOR GATHERING INFORMATION RELATING TO ELECTRONIC CONTENT UTILIZING A DNS SERVER

(75) Inventor: John Sargent, Buckingham (GB)

(73) Assignee: McAfee, Inc., Santa Clara, CA (US)

( * ) Notice: Subject to any disclaimer, the term of this patent is extended or adjusted under 35 U.S.C. 154(b) by 1308 days.

(21) Appl. No.: 11/351,840

(22) Filed: Feb. 9, 2006

(51) Int. Cl.
*G06F 15/173* (2006.01)
*G06F 15/16* (2006.01)

(52) U.S. Cl.
USPC ........... 709/245; 709/203; 709/206; 709/225; 709/248

(58) Field of Classification Search
USPC ......... 709/245, 203, 217–219, 227, 237, 249, 709/206; 707/697–699; 370/395.52
See application file for complete search history.

(56) References Cited

U.S. PATENT DOCUMENTS 5,121,345 A 6/1992 Lentz
5,283,856 A 2/1994 Gross et al.
5,509,120 A 4/1996 Merkin et al.
5,619,648 A 4/1997 Canale et al.
5,623,600 A 4/1997 Ji et al.
5,724,567 A 3/1998 Rose et al.
5,765,028 A 6/1998 Gladden
5,805,911 A 9/1998 Miller
5,832,208 A 11/1998 Chen
5,845,285 A 12/1998 Klein
5,870,549 A 2/1999 Bobo, II
5,987,610 A 11/1999 Franczek et al.
5,999,932 A 12/1999 Paul
6,023,723 A 2/2000 McCormick et al.
6,047,277 A 4/2000 Parry et al.
6,052,709 A 4/2000 Paul
6,073,142 A 6/2000 Geiger et al.
6,092,101 A 7/2000 Birrell et al.
6,101,531 A 8/2000 Eggleston et al.
6,144,934 A 11/2000 Stockwell et al.
6,161,130 A 12/2000 Horvitz et al.
6,167,434 A 12/2000 Pang
6,189,002 B1 2/2001 Roitblat
6,199,102 B1 3/2001 Cobb
6,199,103 B1 3/2001 Sakaguchi et al.
6,219,818 B1 * 4/2001 Freivald et al. ............... 714/799
6,266,692 B1 7/2001 Greenstein (Continued)

FOREIGN PATENT DOCUMENTS

EP 0813162 12/1997
GB 2396993 7/2004

(Continued)

OTHER PUBLICATIONS

W. Gansterer et al. Anti-Spam Methods—State-of-the-Art, Mar. 2005, University of Vienna, Austria, pp. 1, 4-7, 19-21, 29-32, 40-43.*

(Continued)

*Primary Examiner* — Melvin H Pollack
(74) *Attorney, Agent, or Firm* — Patent Capital Group

(57) ABSTRACT

A system, method and computer program product are provided. In use, a checksum associated with electronic content is calculated. Further, a domain name service (DNS) server is queried utilizing the checksum. In response to the query, information is received from the DNS server which relates to the electronic content.

16 Claims, 5 Drawing Sheets

500

502 504

| IP ADDRESS RETURNED | MEANING |
|---|---|
| 127.0.0.1 | GENERIC BAD CHECKSUM |
| 128.0.0.2 | SPAM IMAGE |
| 129.0.0.3 | PHISHING IMAGE |
| 130.0.0.4 | PORNOGRAHIC IMAGE |
| 131.0.0.5 | ILLEGAL PORNOGRAPHIC IMAGE |
| ... | ... |
| | |
| | |

(56) References Cited

U.S. PATENT DOCUMENTS

| | | | | |
|---|---|---|---|---|
| 6,321,267 | B1 | 11/2001 | Donaldson | 709/229 |
| 6,330,590 | B1 | 12/2001 | Cotten | |
| 6,356,935 | B1 | 3/2002 | Gibbs | |
| 6,370,526 | B1 | 4/2002 | Agrawal et al. | |
| 6,393,423 | B1 | 5/2002 | Goedken | |
| 6,393,464 | B1 | 5/2002 | Dieterman | |
| 6,393,465 | B2 | 5/2002 | Leeds | |
| 6,396,513 | B1 | 5/2002 | Helfman | |
| 6,421,709 | B1 | 7/2002 | McCormick et al. | |
| 6,453,327 | B1 | 9/2002 | Nielsen | |
| 6,460,050 | B1 | 10/2002 | Pace et al. | |
| 6,546,390 | B1 | 4/2003 | Pollack et al. | |
| 6,609,081 | B1 | 8/2003 | de Varennes et al. | |
| 6,609,205 | B1 * | 8/2003 | Bernhard et al. | 726/22 |
| 6,615,241 | B1 | 9/2003 | Miller et al. | |
| 6,615,242 | B1 | 9/2003 | Riemers | |
| 6,650,890 | B1 | 11/2003 | Irlam et al. | |
| 6,654,787 | B1 | 11/2003 | Aronson et al. | |
| 6,665,725 | B1 * | 12/2003 | Dietz et al. | 709/230 |
| 6,675,162 | B1 | 1/2004 | Russell-Falla et al. | |
| 6,684,394 | B1 | 1/2004 | Shann | |
| 6,687,740 | B1 | 2/2004 | Gough et al. | |
| 6,691,156 | B1 | 2/2004 | Drummond et al. | |
| 6,718,367 | B1 | 4/2004 | Ayyadurai | |
| 6,732,157 | B1 | 5/2004 | Gordon et al. | 709/206 |
| 6,748,422 | B2 | 6/2004 | Morin et al. | |
| 6,757,830 | B1 | 6/2004 | Tarbotton et al. | 713/188 |
| 6,769,016 | B2 | 7/2004 | Rothwell et al. | 709/206 |
| 6,772,196 | B1 | 8/2004 | Kirsch et al. | |
| 6,772,292 | B2 | 8/2004 | Garber et al. | |
| 6,779,021 | B1 | 8/2004 | Bates et al. | |
| 6,802,012 | B1 | 10/2004 | Smithson et al. | 713/200 |
| 6,807,566 | B1 | 10/2004 | Bates et al. | |
| 6,868,498 | B1 | 3/2005 | Katsikas | |
| 6,915,334 | B1 | 7/2005 | Hall | |
| 7,007,080 | B2 * | 2/2006 | Wilson | 709/221 |
| 7,016,939 | B1 | 3/2006 | Rothwell et al. | |
| 7,047,297 | B2 * | 5/2006 | Huntington et al. | 709/224 |
| 7,072,942 | B1 | 7/2006 | Maller | |
| 7,080,366 | B2 | 7/2006 | Kramskoy et al. | |
| 7,103,645 | B2 * | 9/2006 | Leighton et al. | 709/219 |
| 7,149,189 | B2 * | 12/2006 | Huntington et al. | 370/235 |
| 7,162,698 | B2 * | 1/2007 | Huntington et al. | 715/736 |
| 7,191,327 | B2 * | 3/2007 | Viljoen et al. | 713/2 |
| 7,209,954 | B1 | 4/2007 | Rothwell et al. | |
| 7,213,061 | B1 * | 5/2007 | Hite et al | 709/223 |
| 7,213,062 | B1 * | 5/2007 | Raciborski | 709/223 |
| 7,213,260 | B2 * | 5/2007 | Judge | 726/3 |
| 7,225,244 | B2 * | 5/2007 | Reynolds et al. | 709/223 |
| 7,299,261 | B1 * | 11/2007 | Oliver et al. | 709/206 |
| 7,386,889 | B2 * | 6/2008 | Shay | 726/26 |
| 7,506,155 | B1 | 3/2009 | Stewart et al. | |
| 7,516,489 | B2 * | 4/2009 | Lahti | 726/24 |
| 7,565,423 | B1 * | 7/2009 | Fredricksen | 709/223 |
| 7,574,499 | B1 * | 8/2009 | Swildens et al. | 709/223 |
| 7,580,982 | B2 * | 8/2009 | Owen et al. | 709/206 |
| 7,590,684 | B2 * | 9/2009 | Herrmann | 709/203 |
| 7,594,113 | B2 * | 9/2009 | Tan et al. | 713/169 |
| 7,636,306 | B2 * | 12/2009 | Dougall et al. | 370/230 |
| 7,647,376 | B1 | 1/2010 | Jagger et al. | |
| 7,647,411 | B1 * | 1/2010 | Schiavone et al. | 709/229 |
| 7,664,819 | B2 * | 2/2010 | Murphy et al. | 709/206 |
| 7,689,822 | B2 * | 3/2010 | Maggenti et al. | 713/151 |
| 7,716,367 | B1 * | 5/2010 | Leighton et al. | 709/244 |
| 7,725,602 | B2 * | 5/2010 | Liu et al. | 709/245 |
| 7,756,930 | B2 * | 7/2010 | Brahms et al. | 709/206 |
| 7,774,843 | B1 | 8/2010 | Prakash | |
| 7,797,443 | B1 * | 9/2010 | Pettigrew et al. | 709/232 |
| 7,849,143 | B2 * | 12/2010 | Vuong | 709/206 |
| 7,873,695 | B2 * | 1/2011 | Clegg et al. | 709/206 |
| 7,882,189 | B2 * | 2/2011 | Wilson et al. | 709/206 |
| 7,891,001 | B1 * | 2/2011 | Greenawalt et al. | 726/22 |
| 7,895,651 | B2 * | 2/2011 | Brennan | 726/22 |
| 7,917,588 | B2 * | 3/2011 | Clegg et al. | 709/206 |
| 7,917,961 | B2 * | 3/2011 | McIsaac et al. | 726/28 |
| 7,926,104 | B1 * | 4/2011 | Sundaram et al. | 726/22 |
| 7,970,832 | B2 * | 6/2011 | Perry et al. | 709/206 |
| 7,984,493 | B2 * | 7/2011 | Jones | 726/12 |
| 8,011,003 | B2 * | 8/2011 | Rowney et al. | 726/13 |
| 8,032,594 | B2 * | 10/2011 | Helsper et al. | 709/206 |
| 8,037,144 | B2 * | 10/2011 | Lund et al. | 709/206 |
| 8,037,527 | B2 * | 10/2011 | Milener et al. | 726/22 |
| 8,219,620 | B2 | 7/2012 | Hart | |
| 8,380,791 | B1 | 2/2013 | Gordon et al. | |
| 2002/0001307 | A1 * | 1/2002 | Nguyen et al. | 370/386 |
| 2002/0016824 | A1 | 2/2002 | Leeds | |
| 2002/0112227 | A1 | 8/2002 | Kramskoy et al. | |
| 2002/0116463 | A1 | 8/2002 | Hart | |
| 2002/0120705 | A1 | 8/2002 | Schiavone et al. | |
| 2003/0087646 | A1 * | 5/2003 | Funato et al. | 455/456 |
| 2003/0088627 | A1 | 5/2003 | Rothwell et al. | |
| 2004/0177120 | A1 * | 9/2004 | Kirsch | 709/206 |
| 2005/0015626 | A1 * | 1/2005 | Chasin | 713/201 |
| 2005/0078088 | A1 * | 4/2005 | Davis et al. | 345/163 |
| 2005/0097177 | A1 | 5/2005 | McUmber et al. | 709/206 |
| 2005/0177752 | A1 | 8/2005 | Hollander et al. | 713/201 |
| 2006/0085543 | A1 * | 4/2006 | Hrastar et al. | 709/224 |
| 2006/0101273 | A1 * | 5/2006 | Tan et al. | 713/182 |
| 2006/0149823 | A1 * | 7/2006 | Owen et al. | 709/206 |
| 2007/0067682 | A1 * | 3/2007 | Fang | 714/100 |
| 2007/0079379 | A1 * | 4/2007 | Sprosts et al. | 726/24 |
| 2007/0083929 | A1 * | 4/2007 | Sprosts et al. | 726/22 |
| 2007/0220607 | A1 * | 9/2007 | Sprosts et al. | 726/24 |
| 2008/0140847 | A1 * | 6/2008 | Almog | 709/228 |
| 2009/0262741 | A1 * | 10/2009 | Jungck et al. | 370/392 |
| 2012/0185549 | A1 | 7/2012 | Hart | |
| 2012/0185550 | A1 | 7/2012 | Hart | |
| 2012/0185551 | A1 | 7/2012 | Hart | |

FOREIGN PATENT DOCUMENTS

| | | |
|---|---|---|
| WO | WO 98/37680 | 8/1998 |
| WO | WO 99/33188 | 7/1999 |
| WO | WO 99/67731 | 12/1999 |
| WO | WO 03/010680 | 2/2003 |

OTHER PUBLICATIONS

Rekhter, Y. et al. "Address Allocation for Private Internets," RFC 1918, Feb. 1996.*

Ferguson, P. and Senie, D. "Network Ingress Filtering: Defeating Denial of Service Attacks Which Employ IP Source Address Spoofing," RFC 2827, May 2000.*

Callon, R. and Braun, H. W. "Guidelines for the Use of Internet-IP Addresses in the ISO Connectionless-Mode Network Protocol," RFC 1069, Feb. 1989.*

Warnicke, E. "Suggested Scheme for DNS Resolution of Networks and Gateways," RFC 4183, Sep. 2005.*

Lynn, C. et al. "X.509 Extensions for IP Addresses and AS Identifiers," RFC 3779, Jun. 2004.*

U.S. Appl. No. 09/785,240, filed Feb. 20, 2001.

U.S. Appl. No. 11/281,966, filed Nov. 16, 2005.

U.S. Appl. No. 09/916,599, filed Jul. 26, 2001.

U.S. Appl. No. 10/318,620, filed Dec. 13, 2002.

U.S. Appl. No. 10/072,708, filed Feb. 5, 2002.

DNSBL, http://en.wikipedia.org/wiki/DNSBL.

International Search Report in PCT International Application No. PCT/US02/023811 mailed on Oct. 29, 2002.

International Preliminary Examination Report in PCT International Application No. PCT/US02/23811 completed on Jul. 9, 2003.

Non-Final Office Action in U.S. Appl. No. 09/785,240 mailed on Jun. 14, 2004.

Response to Non-Final Office Action dated Jun. 14, 2004 in U.S. Appl. No. 09/785,240 filed on Sep. 3, 2004.

Non-Final Office Action in U.S. Appl. No. 09/785,240 mailed on Jan. 18, 2005.

Response to Non-Final Office Action dated Jan. 18, 2005 in U.S. Appl. No. 09/785,240 filed on Apr. 18, 2005.

Non-Final Office Action in U.S. Appl. No. 09/785,240 mailed on Jun. 30, 2005.

(56) References Cited

OTHER PUBLICATIONS

Response to Non-Final Office Action dated Jun. 30, 2005 in U.S. Appl. No. 09/785,240 filed on Oct. 12, 2005.
Final Office Action in U.S. Appl. No. 09/785,240 mailed on Jan. 3, 2006.
Response to Final Office Action dated Jan. 3, 2006 in U.S. Appl. No. 09/785,240 filed on Feb. 21, 2006.
Advisory Action in U.S. Appl. No. 09/785,240 mailed on Mar. 23, 2006.
Pre-Brief Conference Request and Notice of Appeal in U.S. Appl. No. 09/785,240 filed on May 5, 2006.
Pre-Brief Conference Decision in U.S. Appl. No. 09/785,240 mailed on Jul. 5, 2006.
Appeal Brief in U.S. Appl. No. 09/785,240 filed on Feb. 26, 2007.
Examiner's Answer to Appeal Brief in U.S. Appl. No. 09/785,240 mailed on Nov. 16, 2007.
Reply Brief in U.S. Appl. No. 09/785,240 filed on Jan. 16, 2008.
Non-Final Office Action in U.S. Appl. No. 11/281,966 mailed on Sep. 18, 2009.
Response to Non-Final Office Action dated Sep. 18, 2009 in U.S. Appl. No. 11/281,966 filed on Dec. 18, 2009.
Notice of Allowance in U.S. Appl. No. 11/281,966 mailed on Apr. 1, 2010.
Non-Final Office Action in U.S. Appl. No. 11/095,146 mailed on Jul. 18, 2006.
Response to Non-Final Office Action dated Jul. 18, 2006 in U.S. Appl. No. 11/095,146 filed on Nov. 20, 2006.
Notice of Allowance in U.S. Appl. No. 11/095,146 mailed on Dec. 15, 2006.
USPTO File History for U.S. Appl. No. 09/916,930 filed on Jul. 26, 2001.
Non-Final Office Action in U.S. Appl. No. 10/072,708 mailed on Apr. 6, 2005.
Response to Non-Final Office Action dated Apr. 6, 2005 in U.S. Appl. No. 10/072,708 filed on May 4, 2005.
Non-Final Office Action in U.S. Appl. No. 10/072,708 mailed on Jul. 25, 2008.
Response to Non-Final Office Action dated Jul. 25, 2008 in U.S. Appl. No. 10/072,708 filed on Aug. 30, 2005.
Non-Final Office Action in U.S. Appl. No. 10/072,708 mailed on Nov. 18, 2005.
Response to Non-Final Office Action dated Nov. 18, 2005 in U.S. Appl. No. 10/072,708 filed on Feb. 13, 2006.
Final Office Action in U.S. Appl. No. 10/072,708 mailed on May 3, 2006.
Pre-Brief Conference Request and Notice of Appeal in U.S. Appl. No. 10/072,708 filed on Aug. 3, 2006.
Supplemental Appeal Brief in U.S. Appl. No. 10/072,708 filed on Mar. 8, 2007.
Examiner's Answer to Appeal Brief in U.S. Appl. No. 10/072,708 mailed on Jul. 2, 2007.
Reply Brief in U.S. Appl. No. 10/072,708 filed on Sep. 4, 2007.
BAPI Decision in U.S. Appl. No. 10/072,708 mailed on Feb. 26, 2009.
Request for Continued Examination and Amendment in U.S. Appl. No. 10/072,708 mailed on Apr. 27, 2009.
Non-Final Office Action in U.S. Appl. No. 10/072,708 mailed on May 28, 2009.
Response to Non-Final Office Action dated May 28, 2009 in U.S. Appl. No. 10/072,708 filed on Aug. 28, 2009.
Notice of Allowance, Examiner Interview Summary, Notice of Allowability in U.S. Appl. No. 10/072,708 mailed on Nov. 2, 2009.
Non-Final Office Action in U.S. Appl. No. 09/916,599 mailed on Oct. 7, 2004.
Response to Non-Final Office Action dated Oct. 7, 2001 in U.S. Appl. No. 09/916,599 filed on Oct. 21, 2004.
Non-Final Office Action in U.S. Appl. No. 09/916,599 mailed on Feb. 23, 2005.
Response to Non-Final Office Action dated Feb. 23, 2005 in U.S. Appl. No. 09/916,599 filed on Mar. 30, 2005.
Notice of Allowance in U.S. Appl. No. 09/916,599 mailed on Jun. 10, 2005.
Notice of Allowance in U.S. Appl. No. 09/916,599 mailed on Sep. 23, 2005.
Tim Bass, Lt. Col. Glenn Watt, "A Simple Framework for Filtering Queued SMTP Mail", 1997, IEEE, pp. 1140-1144.
BPAI Decision on Appeal in U.S. Appl. No. 09/785,240 mailed on Oct. 6, 2011.
Response to Final Office Action in U.S. Appl. No. 13/429,345 filed on Apr. 29, 2013.
Non-Final Office Action in U.S. Appl. No. 13/429,345 mailed on Jun. 20, 2013.
Response to Final Office Action in U.S. Appl. No. 13/429,354 filed on Apr. 29, 2013.
Non-Final Office Action in U.S. Appl. No. 13/429,354 mailed on Jun. 21, 2013.
Notice of Allowance in U.S. Appl. No. 09/785,240 mailed on Jun. 7, 2012.
Non-Final Office Action in U.S. Appl. No. 13/429,338 mailed on Jun. 28, 2012.
Response to Non-Final Office Action dated Jun. 28, 2012 in U.S. Appl. No. 13/429,338 filed on Sep. 28, 2012.
Final Office Action in U.S. Appl. No. 13/429,338 mailed on Jan. 18, 2013.
Non-Final Office Action in U.S. Appl. No. 13/429,345 mailed on Jun. 28, 2012.
Response to Non-Final Office Action dated Jun. 28, 2012 in U.S. Appl. No. 13/429,345 filed on Sep. 28, 2012.
Non-Final Office Action in U.S. Appl. No. 13/429,354 mailed on Jun. 21, 2012.
Response to Non-Final Office Action dated Jun. 21, 2012 in U.S. Appl. No. 13/429,354 filed on Sep. 21, 2012.
Final Office Action in U.S. Appl. No. 13/429,345 mailed on Jan. 29, 2013.
Final Office Action in U.S. Appl. No. 13/429,354 mailed on Jan. 29, 2013.
John Viega et al., "Mailman: The GNU Mailing List Manager," 1998 LISA XII—Dec. 6-11, 1998 (pp. 309-316).
PCT Written Opinion in International Application Serial No. PCT/US02/23811 mailed on May 1, 2003.
Request for Continued Examination and Amendment in U.S. Appl. No. 09/785,240 filed on Nov. 30, 2011.
Notice of Allowance and Examiner Interview Summary in U.S. Appl. No. 09/785,240 mailed on Jan. 6, 2012.
Request for Continued Examination and Amendment in U.S. Appl. No. 09/785,240 filed on Mar. 7, 2012.
U.S. Appl. No. 13/429,338 entitled "Unwanted E-Mail Filtering System Including Voting Feedback", filed on Mar. 24, 2012.
U.S. Appl. No. 13/429,354 entitled "Unwanted E-Mail Filtering System Including Voting Feedback", filed on Mar. 24, 2012.
Office Actions and Responses in U.S. Appl. No. 10/318,620.

* cited by examiner

| IP ADDRESS RETURNED | MEANING |
| --- | --- |
| 127.0.0.1 | GENERIC BAD CHECKSUM |
| 128.0.0.2 | SPAM IMAGE |
| 129.0.0.3 | PHISHING IMAGE |
| 130.0.0.4 | PORNOGRAHIC IMAGE |
| 131.0.0.5 | ILLEGAL PORNOGRAPHIC IMAGE |
| ... | ... |
| | |
| | |

SYSTEM, METHOD AND COMPUTER PROGRAM PRODUCT FOR GATHERING INFORMATION RELATING TO ELECTRONIC CONTENT UTILIZING A DNS SERVER

FIELD OF THE INVENTION

The present invention relates to electronic content, and more particularly to gathering information relating to electronic content.

BACKGROUND

The Internet is constantly growing in popularity, and more and more people are conducting business over the Internet, advertising their products and services by generating and sending electronic mass mailings. This electronic mail (e-mail) is usually unsolicited and regarded as nuisances by the recipients because they occupy much of the storage space needed for necessary and important data processing.

Therefore, it is highly desirable to have a filter system for screening and managing unwanted e-mails (and other electronic content, for that matter), while desired e-mails pass through the system to reach the recipients. Presently, there are products that are capable of filtering out unwanted e-mails, etc.

For example, one method exists which keeps an index list of all agents (e.g. companies, origination addresses, etc.) that generate mass unsolicited e-mails, and provides a mechanism to block any e-mail sent from each agent on the list. Another filter currently available employs filters which are based on predefined characteristics [e.g. words, uniform resource locators (URLs), patterns, etc.]. An incoming e-mail may thus be designated as an unwanted e-mail if, for example, it contains one or more of such characteristics.

In order to be effective, the aforementioned lists and/or characteristics must be constantly updated in order for the foregoing systems to be effective. Currently, these updates are streamed out to filtering systems at regular, predetermined intervals, and are streamed in their entirety. Unfortunately, this can result in considerable use of network bandwidth and/or other resources.

There is thus a need for overcoming these and/or other problems associated with the prior art.

SUMMARY

A system, method and computer program product are provided. In use, a checksum associated with electronic content is calculated. Further, a domain name service (DNS) server is queried utilizing the checksum. In response to the query, information is received from the DNS server which relates to the electronic content.

DETAILED DESCRIPTION

Figure 1:
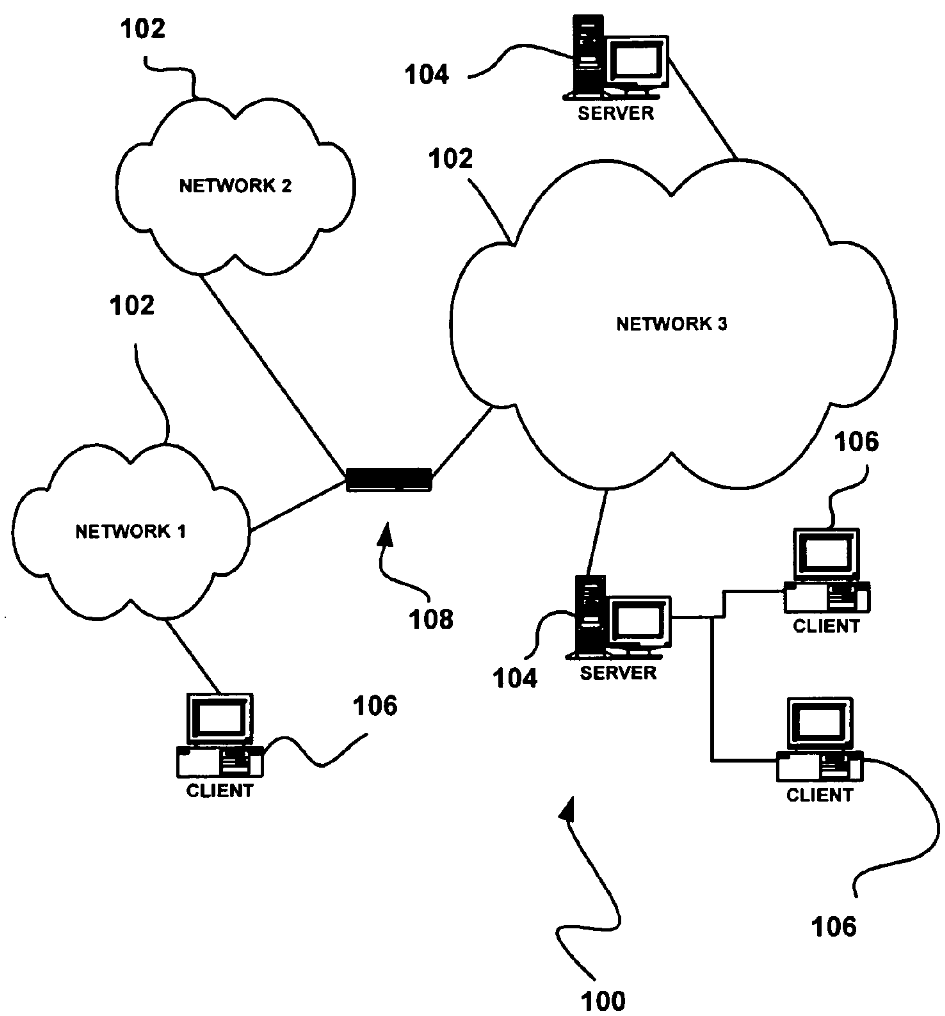
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a domain name service (DNS) server, desktop computer, laptop computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

Figure 2:
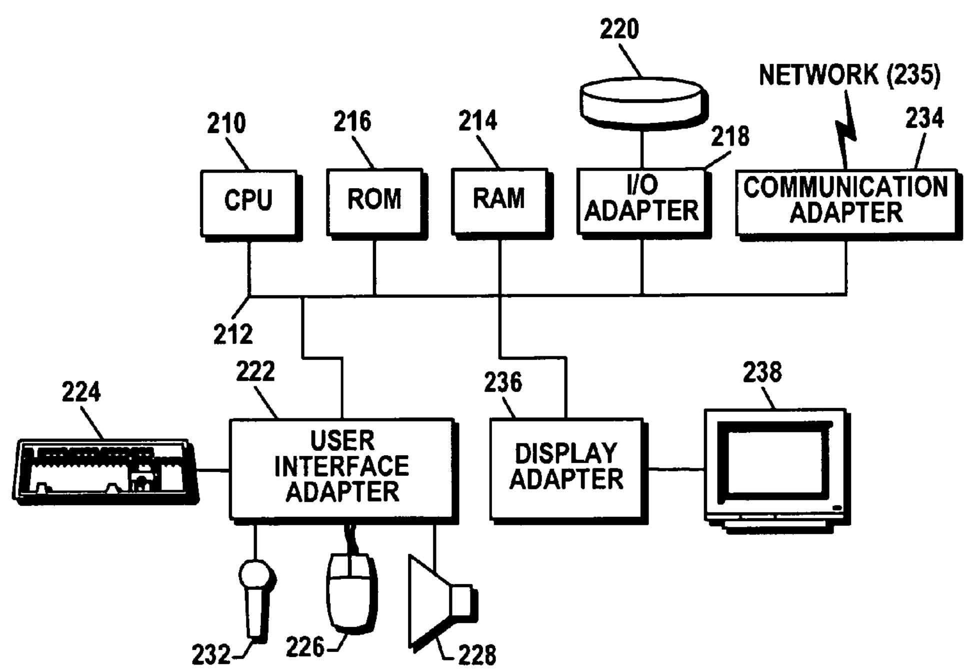
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
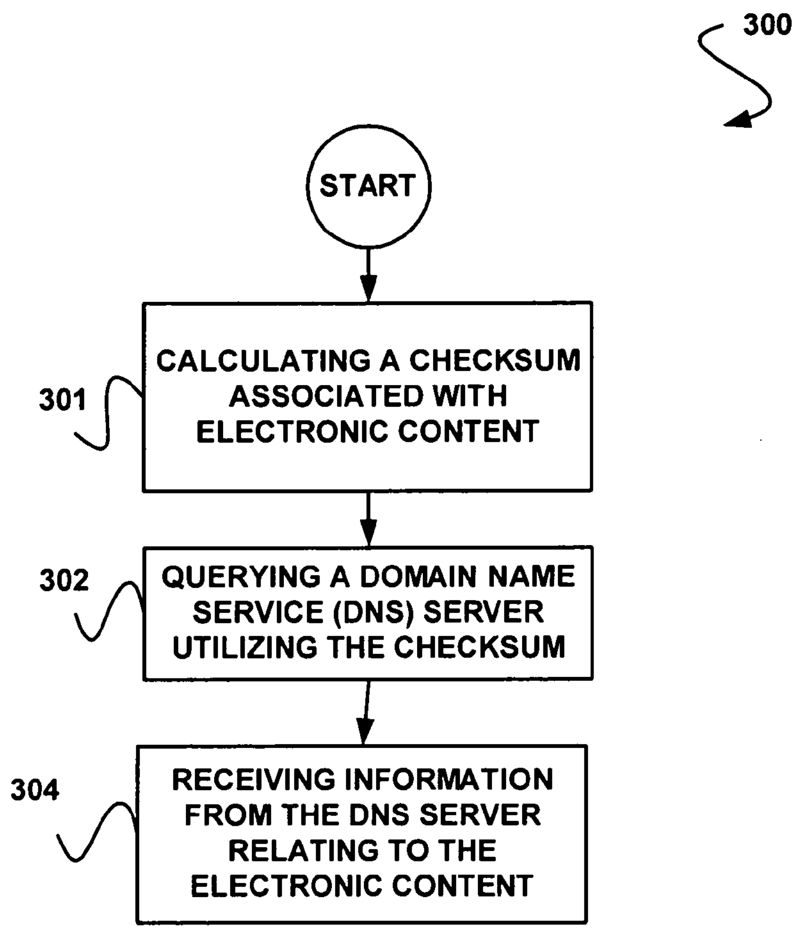
FIG. 3 shows a method for gathering information relating to electronic content, in accordance with one embodiment.

FIG. 3 shows a method 300 for gathering information relating to electronic content, in accordance with one embodiment. As an option, the method 300 may be implemented in the context of the architecture and environment of FIGS. 1 and/or 2. Of course, however, the method 300 may be carried out in any desired environment.

As shown, a checksum associated with electronic content is calculated. See operation 301. In the context of the present embodiment, such electronic content may refer to an electronic mail message, a web page, a file, and/or any other content (and/or component, artifact, etc. thereof) that may be distributed over a network (e.g. see, for example, the networks 102 of FIG. 1, etc.).

In an optional embodiment where the electronic content refers to an electronic mail message, such a message may be sent utilizing the simple mail transfer protocol (SMTP), and may be received utilizing the POP3 protocol. Still yet, in other embodiments, the electronic mail message may be generated and received utilizing an electronic mail message manager (e.g. MICROSOFT OUTLOOK, etc.) including composing, reading, and sending capabilities. Of course, other protocols are contemplated including, but not limited to ESMTP, X.400, instant messaging protocols, etc.

Further in the context of the present description, the checksum may refer to any string capable of being received and utilized by a DNS server (as defined below). For example, in one optional embodiment, the checksum may include a value or signature derived from a calculation performed upon one or more components [e.g. image, binary string, uniform resource locator (URL), text string, characters, bits, etc.] of the electronic content such that, when re-calculated, the same value is provided for the one or more components. Further, such value is unique to such set of components.

Next, in operation 302, a domain name service (DNS) server is queried utilizing the checksum. In the context of the present description, the DNS server may refer to any computer that is capable of making information available, in response to a query including the aforementioned checksum. To this end, in response to the query, information is received from the DNS server which relates to the electronic content. Note operation 304. It should be noted that the aforementioned information may include any information relating to the electronic content that may be used for absolutely any purpose desired.

For example, in one optional embodiment, the DNS server may resolve a string concocted utilizing the checksum and formatted as (or similar to) a host name, with an Internet Protocol (IP) address that may itself include and/or be used to gain access to information relating to the electronic content. Further, in the context of one embodiment for identifying unwanted electronic mail messages, the IP address may be utilized to determine whether the electronic mail message is unwanted, and/or determine an action to be taken on the electronic mail message.

More illustrative information will now be set forth regarding various optional architectures and features with which the foregoing technique may or may not be implemented, per the desires of the user. Specifically, more information will be set forth regarding an optional embodiment whereby the various techniques associated with the method 300 of FIG. 3 are used to identify unwanted electronic mail messages.

It should be strongly noted, however, that the following information is set forth for illustrative purposes and should not be construed as limiting in any manner. Any of the following features may be optionally incorporated with or without the exclusion of other features described in and out of a security-related context.

Figure 4:
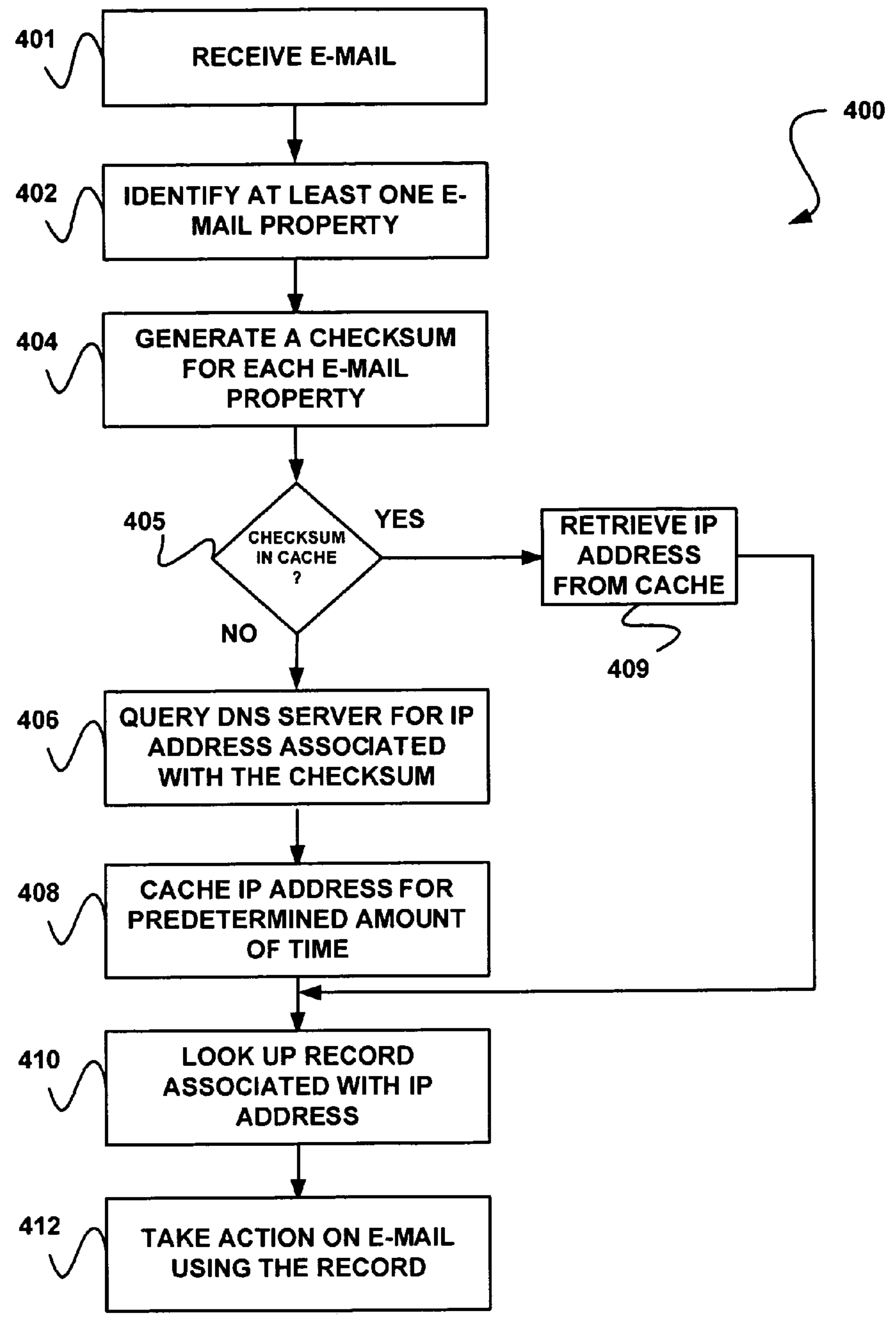
FIG. 4 illustrates a method for gathering information relating to electronic content, in accordance with another embodiment.

FIG. 4 illustrates a method 400 for gathering information relating to electronic content, in accordance with another embodiment. As an option, the method 400 may be implemented in the context of the architecture and environment of FIGS. 1-3. Of course, however, the method 400 may be used in any desired environment. Further, the aforementioned definitions may equally apply to the description below.

As shown, in operation 401, an electronic message is initially received. Such electronic message may be received at a client computer (e.g. see, for example, the client computers 106 of FIG. 1, etc.) and/or at a server computer (e.g. see, for example, the server computers 104 of FIG. 1, etc.) via one or more networks (e.g. see, for example, the networks 102 of FIG. 1, etc.). Optionally, such receipt may be carried out utilizing a server or client-based electronic mail manager.

After receiving the electronic mail message, at least one property associated with such electronic mail message may be identified. Note operation 402. As mentioned previously, such one or more properties may include any component [e.g. image, binary string, uniform resource locator (URL), text string, characters, bits, etc.] of the electronic mail message. Further, such properties may be parsed in any desired manner. Just by way of example, a list of desired components may be provided, whereby each of such components may be identified by parsing the electronic mail message.

Thereafter, in operation 404, a checksum is generated for each property of the electronic mail message. To this one, a plurality of checksums is provided as a result of the present operation. Table 1 illustrates one example of a checksum that relates to an image associated with an electronic mail message. Of course, the 40 character string checksum is set forth for illustrative purposes only and should not be construed as limiting in any manner whatsoever.

TABLE 1

| 434683b65810caff6e9e5cb8fc52def422ad5f30 |
|---|

Next, it is determined whether the checksum(s) is present in a cache. See decision 405. It should be noted that such cache may include cache memory on a computer at which the electronic mail message was received, a local DNS server, and/or any other cache, for that matter. More information regarding such cache will be set forth hereinafter in greater detail.

If it is determined that the checksum is not already stored in the cache per decision 405, a DNS server is queried for an IP address associated with the checksum. Note operation 406. Such DNS server may include a local DNS server, remote DNS server, and/or any other DNS server that requires more time and/or resources (e.g. bandwidth, processing, etc.) for producing the IP address, with respect to the aforementioned cache. For reasons that will soon become apparent, each of the IP addresses delivered by the DNS server includes and/or provides access to information associated with the electronic mail message property represented by the checksum.

In the context of the example where the checksum takes the form shown in Table 1, the query made to the DNS server may take the form of a pseudo-host in an "antispam" domain (e.g. image-rbl.mcafee.com, etc.) in order to obtain the information regarding the checksum (and associated electronic message property, etc.).

Strictly as an option, a plurality of domains may be provided for servicing different checksums. For example, a first domain may be used to service checksums associated with images in electronic mail messages, a second domain may be used to service checksums associated with text strings in electronic mail messages, and so forth.

Table 2 illustrates one example of a DNS server query. Of course, such query is set forth for illustrative purposes only and should not be construed as limiting in any manner whatsoever.

TABLE 2

| 434683b65810caff6e9e5cb8fc52def422ad5f30.image-rbl.mcafee.com |
|---|

Next, in operation 408, the IP address received via the DNS server in operation 406 is stored in the cache. Such IP address is cached in association with the corresponding checksum. Further, as an option, the checksum and the associated IP address may be cached a predetermined amount of time. Still yet, the predetermined amount of time may be determined utilizing the IP address, in a manner that will soon become apparent.

Reference will now be made back to decision 405. If, on the other hand, it is determined that the checksum is indeed already stored in the cache per decision 405, the associated IP address may simply be retrieved from cache. To this end, the querying of the DNS server in operation 406 is conditionally performed based on whether the IP address is cached, thereby saving time and/or resources by skipping operations 406-408, if possible.

In any case, armed with the appropriate IP address (if one is received at all), information in the form of a record may be looked up using the same. Note operation 410. If, for some reason, no IP address is available, a default action may be taken. For example, it may be assumed that the electronic mail message that has the property that gave rise to the checksum is wanted, or at least not unwanted. On the other hand, if such IP address is found, it may be used to retrieve additional information describing the property, and by inference, the electronic mail message.

In one embodiment, the additional information may be stored on (and/or near) a computer that carried out any one or more of the operations 401-409. Further, such information may be used to determine whether the electronic mail message associated with the property is unwanted, and determine an action to be taken on the electronic mail message. See operation 412. More information regarding such information will be set forth in greater detail during reference to FIG. 5.

By these features, a computer may optionally forego downloading unwanted electronic mail message database updates periodically, and may further build a local list containing only information relevant to the computer at issue, using a DNS system.

Figure 5:
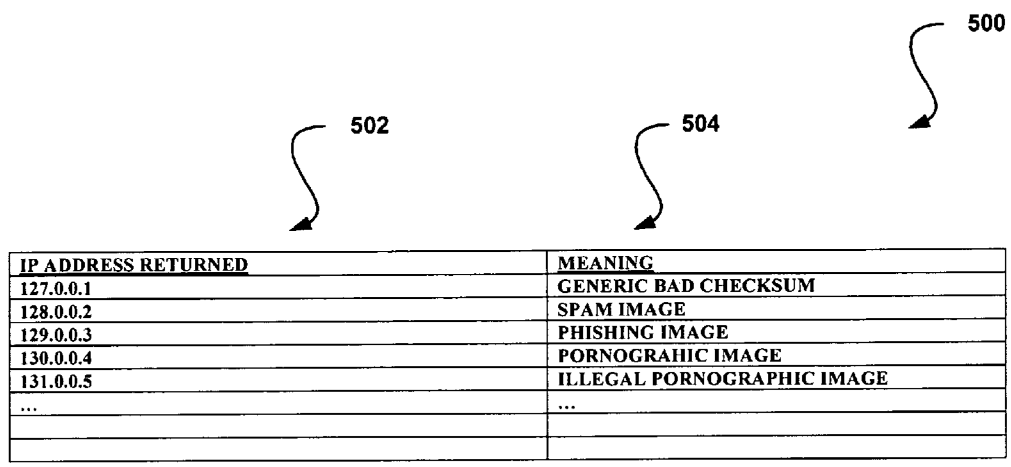
FIG. 5 illustrates a data structure for gathering information relating to electronic content, in accordance with another embodiment.

FIG. 5 illustrates a data structure 500 for gathering information relating to electronic content, in accordance with another embodiment. As an option, the data structure 500 may be implemented in the context of operation 410 of FIG. 4. Of course, however, the data structure 500 may be used in any desired environment. Further, the aforementioned definitions may equally apply to the description below.

As shown, a plurality of IP addresses 502 is provided each with associated information 504. As shown, such information 504 may identify whether the electronic content is unwanted and, if so, a type, description, identification, etc. thereof.

While not shown, the information 504 may further identify an action to be taken on the electronic content. Such action may include, but is not limited to quarantining the content, deleting the content, cleaning the content, generating an alert, notifying an administrator regarding the content, etc.

Even still, the information 504 may further identify an amount of time that the checksum/IP address is to be cached. See operation 408 of FIG. 4, for example. This length of time may be user-configured based on any desired criteria. Just by way of example, checksums associated with mail properties that are serious and/or occur often may be cached longer, and visa-versa.

As yet another option, each portion of the dotted-quad IP address may provide specific information about the electronic mail property queried. See Table 3, for example.

TABLE 3

| IP Address: aaa.b.c.d |
|---|

Thus, each of the portions may be altered to manage a particular aspect of e-mail content. Table 4 illustrates one exemplary specific IP address that indicates that a checksum matches a pornographic image, to be deleted, where the checksum should not be cached longer than 15 days.

TABLE 4

| 129.0.15.4 |
|---|

To this end, the correlation of various IP addresses/information and associated checksums/electronic content may be carried out by one or more administrators, or in any other desired manner, at a central (or distributed) location. Further, such correlation may be updated and/or changed at any time. For example, an action and/or cache period may be altered with respect to a uniquely identified item of unwanted content, based on various factors, etc.

Further, a particular computer may efficiently build up a cache of checksums that are relevant to types of electronic mail messages (or other content) that are received, without necessarily downloading large volumes of checksums and/or other updates, many or most of which may never be used. This may be particularly valuable for applications running on computers that have restricted bandwidth and/or only process a few electronic mail messages each day.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems.

Thus, by optionally incorporating the present technology into the cyber-frameworks of the foregoing potential targets, terrorism may be countered by preventing inundation with unwanted electronic content, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:

calculating a checksum associated with electronic content associated with an electronic e-mail message;

querying a selected one of a plurality of domain name service (DNS) servers, wherein at least one of the servers is associated with an antispam domain configured to evaluate checksum data and to maintain a cache that includes a plurality of checksum entries; and receiving information from the selected DNS server relating to the electronic content, wherein the information includes an Internet Protocol (IP) address retrieved from the cache, and the information is utilized to look up additional information that identifies whether the electronic e-mail message is to be quarantined and that indicates a time for which the checksum is to be cached.

2. The method of claim 1, wherein the checksum is generated based on an image associated with the electronic content.

3. The method of claim 1, wherein the checksum is generated based on a binary string associated with the electronic content.

4. The method of claim 1, wherein the checksum is generated based on a uniform resource locator (URL) associated with the electronic content.

5. The method of claim 1, wherein the checksum is generated based on a text string associated with the electronic content.

6. The method of claim 1, wherein the IP address is utilized to determine whether the electronic content is unwanted.

7. The method of claim 1, wherein the IP address is utilized to determine an action to be taken on the electronic content.

8. The method of claim 1, wherein the plurality of DNS servers includes a remote DNS server, and the checksum and the IP address are cached utilizing a local DNS server.

9. The method of claim 1, wherein the querying is conditionally performed based on whether the IP address is cached.

10. A computer program product embodied on a non-transitory computer readable medium for performing operations, comprising:

calculating a checksum associated with electronic content associated with an electronic e-mail message;

querying a selected one of a plurality of domain name service (DNS) servers, wherein at least one of the servers is associated with an antispam domain configured to evaluate checksum data and to maintain a cache that includes a plurality of checksum entries; and obtaining information relating to the electronic content based on the query, wherein the information includes an Internet Protocol (IP) address retrieved from the cache and is utilized to look up additional information that identifies whether the electronic e-mail message is to be quarantined and that indicates a time for which the checksum is to be cached.

11. A system, comprising:

a computer, wherein the system is configured for:

calculating a checksum associated with electronic content associated with an electronic e-mail message; and querying a selected one of a plurality of domain name service (DNS) servers, wherein at least one of the servers is associated with an antispam domain configured to evaluate checksum data and to maintain a cache that includes a plurality of checksum entries, wherein information relating to the electronic content is made available utilizing the DNS server query, and wherein the information includes an Internet Protocol (IP) address retrieved from the cache, and the information is utilized to look up additional information that identifies whether the electronic e-mail message is to be quarantined and that indicates a time for which the checksum is to be cached.

12. The method of claim 1, wherein the information includes the IP address relating to the electronic content and the selected DNS server resolves a string concocted utilizing the checksum and formatted as a host name with the IP address.

13. The method of claim 1, wherein the query to the selected DNS server utilizing the checksum includes prepending the checksum to a domain name of the selected DNS server.

14. The method of claim 1, wherein the plurality of DNS servers includes a first DNS server that is used for checksums associated with images if the checksum is associated with an image in an electronic email message, and the plurality of DNS servers includes a second DNS server that is used for checksums associated with text strings if the checksum is associated with text strings in an electronic email message.

15. The method of claim 1, wherein the IP address is a dotted-quad IP address in the format ‘aaa.b.c.d’, and provides specific information about the electronic content.

16. The method of claim 15, wherein each of ‘aaa’, ‘b’, ‘c’, and ‘d’ of the IP address are associated with at least one of an identification of a property of the electronic content, an identification of a type of the property of the electronic content, an identification of an action to be taken on the electronic content, and an identification of a duration of which at least one of the checksum and the IP address is to be cached.

* * * * *